United States Patent
Petrescu et al.

(10) Patent No.: US 11,575,829 B2
(45) Date of Patent: Feb. 7, 2023

(54) ENHANCED IMAGE CAPTURE

(71) Applicant: Google Technology Holdings LLC, Mountain View, CA (US)

(72) Inventors: Doina I. Petrescu, Vernon Hills, IL (US); Thomas T. Lay, Highland Park, IL (US); Steven R. Petrie, Grayslake, IL (US); Bill Ryan, Libertyville, IL (US); Snigdha Sinha, Brookfield, WI (US); Jeffrey S. Vanhoof, Gurnee, IL (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/651,256

(22) Filed: Feb. 16, 2022

(65) Prior Publication Data
US 2022/0174210 A1 Jun. 2, 2022

Related U.S. Application Data

(63) Continuation of application No. 17/234,257, filed on Apr. 19, 2021, now Pat. No. 11,290,639, which is a
(Continued)

(51) Int. Cl.
*H04N 5/335* (2011.01)
*H04N 5/232* (2006.01)
(Continued)

(52) U.S. Cl.
CPC ......... *H04N 5/23222* (2013.01); *H04N 1/00* (2013.01); *H04N 1/00244* (2013.01); *H04N 1/21* (2013.01);
(Continued)

(58) Field of Classification Search
None
See application file for complete search history.

(56) References Cited

U.S. PATENT DOCUMENTS

| 4,881,127 A | 11/1989 | Isoguchi et al. |
| 5,294,990 A | 3/1994 | Aoki et al. |
| (Continued) | | |

FOREIGN PATENT DOCUMENTS

| AU | 2015264713 | 9/2016 |
| CN | 101365061 | 2/2009 |
| (Continued) | | |

OTHER PUBLICATIONS

"Advisory Action", U.S. Appl. No. 14/231,644, dated Sep. 27, 2017, 3 pages.
(Continued)

*Primary Examiner* — Gary C Vieaux
(74) *Attorney, Agent, or Firm* — Colby Nipper PLLC

(57) ABSTRACT

Disclosed are techniques that provide a "best" picture taken within a few seconds of the moment when a capture command is received (e.g., when the "shutter" button is pressed). In some situations, several still images are automatically (that is, without the user's input) captured. These images are compared to find a "best" image that is presented to the photographer for consideration. Video is also captured automatically and analyzed to see if there is an action scene or other motion content around the time of the capture command. If the analysis reveals anything interesting, then the video clip is presented to the photographer. The video clip may be cropped to match the still-capture scene and to remove transitory parts. Higher-precision horizon detection may be provided based on motion analysis and on pixel-data analysis.

22 Claims, 9 Drawing Sheets

Related U.S. Application Data continuation of application No. 16/289,050, filed on Feb. 28, 2019, now Pat. No. 11,019,252, which is a continuation of application No. 14/450,492, filed on Aug. 4, 2014, now Pat. No. 10,250,799.

(60) Provisional application No. 62/001,327, filed on May 21, 2014.

(51) Int. Cl.
    *H04N 1/00*     (2006.01)
    *H04N 1/21*     (2006.01)

(52) U.S. Cl.
    CPC ............ *H04N 1/212* (2013.01); *H04N 1/215* (2013.01); *H04N 1/2145* (2013.01); *H04N 5/232* (2013.01); *H04N 5/23216* (2013.01); *H04N 5/23218* (2018.08); *H04N 5/23219* (2013.01); *H04N 5/23229* (2013.01); *H04N 5/23254* (2013.01); *H04N 5/23258* (2013.01); *H04N 5/23267* (2013.01); *H04N 5/23293* (2013.01); *H04N 5/232933* (2018.08); *H04N 5/23245* (2013.01); *H04N 2201/3247* (2013.01)

(56) References Cited

U.S. PATENT DOCUMENTS

| | | |
|---|---|---|
| 5,505,199 A | 4/1996 | Kim |
| 5,909,246 A | 6/1999 | Terashima |
| 6,167,356 A | 12/2000 | Squadron et al. |
| 6,347,925 B1 | 2/2002 | Woodard et al. |
| 6,529,253 B1 | 3/2003 | Matsute |
| 6,614,471 B1 | 9/2003 | Ott |
| 7,190,263 B2 | 3/2007 | McKay et al. |
| 7,301,563 B1 | 11/2007 | Kakinuma et al. |
| 7,414,665 B2 | 8/2008 | Watanabe et al. |
| 7,450,187 B2 | 11/2008 | Sun |
| 7,982,770 B1 | 7/2011 | Kahn et al. |
| 8,295,631 B2 | 10/2012 | Adams et al. |
| 8,484,149 B1 | 7/2013 | Kelly |
| 8,619,128 B2 | 12/2013 | Bilbrey et al. |
| 8,803,985 B2 | 8/2014 | Kaizu et al. |
| 8,957,916 B1 | 2/2015 | Hedman et al. |
| 9,117,483 B2 | 8/2015 | Zaletel |
| 9,143,749 B2 | 9/2015 | Wernersson |
| 9,189,137 B2 | 11/2015 | Boiman et al. |
| 9,325,876 B1 | 4/2016 | Terrill et al. |
| 9,344,639 B2 | 5/2016 | Musatenko et al. |
| 9,357,127 B2 | 5/2016 | Lameer et al. |
| 9,392,322 B2 | 7/2016 | Thorson |
| 9,413,947 B2 | 8/2016 | Waddington |
| 9,436,705 B2 | 9/2016 | Shakib et al. |
| 9,571,727 B2 | 2/2017 | Lay |
| 9,628,702 B2 | 4/2017 | Petrescu et al. |
| 9,652,475 B2 | 5/2017 | Shakib et al. |
| 9,729,784 B2 | 8/2017 | Petrescu et al. |
| 9,774,779 B2 | 9/2017 | Petrescu et al. |
| 9,813,611 B2 | 11/2017 | Petrescu et al. |
| 10,250,799 B2 | 4/2019 | Petrescu et al. |
| 11,019,252 B2 | 5/2021 | Petrescu et al. |
| 11,290,639 B2 | 3/2022 | Petrescu et al. |
| 2002/0047909 A1 | 4/2002 | Hatae et al. |
| 2002/0080263 A1 | 6/2002 | Krymski |
| 2003/0007088 A1 | 1/2003 | Rantanen et al. |
| 2003/0052989 A1 | 3/2003 | Bean et al. |
| 2004/0107103 A1 | 6/2004 | Iyengar et al. |
| 2005/0001908 A1 | 1/2005 | Lee |
| 2005/0154318 A1 | 7/2005 | Sato et al. |
| 2005/0206820 A1 | 9/2005 | Palmer |
| 2005/0219666 A1 | 10/2005 | Ejima et al. |
| 2006/0156243 A1 | 7/2006 | Lee et al. |
| 2006/0156374 A1 | 7/2006 | Hu et al. |
| 2007/0090283 A1 | 4/2007 | Linke et al. |
| 2007/0115459 A1 | 5/2007 | Nakao et al. |
| 2007/0177805 A1 | 8/2007 | Gallagher |
| 2007/0201815 A1 | 8/2007 | Griffin |
| 2007/0237423 A1 | 10/2007 | Tico et al. |
| 2008/0077020 A1 | 3/2008 | Young et al. |
| 2008/0091635 A1 | 4/2008 | James et al. |
| 2008/0154931 A1 | 6/2008 | Jacobs et al. |
| 2008/0274798 A1 | 11/2008 | Walker et al. |
| 2009/0086074 A1 | 4/2009 | Li et al. |
| 2009/0087037 A1 | 4/2009 | Wada |
| 2009/0087099 A1 | 4/2009 | Nakamura |
| 2009/0109309 A1 | 4/2009 | He et al. |
| 2009/0115861 A1 | 5/2009 | Mochizuki |
| 2009/0189992 A1 | 7/2009 | Zhang et al. |
| 2009/0190803 A1 | 7/2009 | Neghina et al. |
| 2009/0291707 A1 | 11/2009 | Choi |
| 2010/0091119 A1 | 4/2010 | Lee |
| 2010/0097491 A1 | 4/2010 | Farina et al. |
| 2010/0149393 A1 | 6/2010 | Zarnowski et al. |
| 2010/0195912 A1 | 8/2010 | Nakada et al. |
| 2010/0208082 A1 | 8/2010 | Buchner et al. |
| 2010/0245596 A1 | 9/2010 | Tirpak et al. |
| 2010/0271469 A1 | 10/2010 | She |
| 2010/0295966 A1 | 11/2010 | Furlan |
| 2010/0309333 A1 | 12/2010 | Smith et al. |
| 2010/0309334 A1 | 12/2010 | James et al. |
| 2010/0309335 A1 | 12/2010 | Brunner et al. |
| 2011/0013807 A1 | 1/2011 | Lee et al. |
| 2011/0032429 A1 | 2/2011 | Bing |
| 2011/0043651 A1 | 2/2011 | Nonaka et al. |
| 2011/0043691 A1 | 2/2011 | Guitteny et al. |
| 2011/0052136 A1 | 3/2011 | Homan et al. |
| 2011/0069189 A1 | 3/2011 | Venkataraman et al. |
| 2011/0107369 A1 | 5/2011 | O'Brien et al. |
| 2011/0122315 A1 | 5/2011 | Schweiger et al. |
| 2011/0183651 A1 | 7/2011 | Mundy et al. |
| 2011/0199470 A1 | 8/2011 | Moller et al. |
| 2011/0205433 A1 | 8/2011 | Altmann et al. |
| 2011/0218997 A1 | 9/2011 | Boiman et al. |
| 2012/0063736 A1 | 3/2012 | Simmons et al. |
| 2012/0081579 A1 | 4/2012 | Doepke |
| 2012/0096357 A1 | 4/2012 | Folgner et al. |
| 2012/0105584 A1 | 5/2012 | Gallagher et al. |
| 2012/0189284 A1 | 7/2012 | Morrison et al. |
| 2012/0219271 A1 | 8/2012 | Vunic et al. |
| 2012/0263439 A1 | 10/2012 | Lassman et al. |
| 2012/0314901 A1 | 12/2012 | Hanson et al. |
| 2013/0016251 A1 | 1/2013 | Ogasahara |
| 2013/0051756 A1 | 2/2013 | Chao et al. |
| 2013/0057713 A1 | 3/2013 | Khawand |
| 2013/0077835 A1 | 3/2013 | Kritt et al. |
| 2013/0142418 A1 | 6/2013 | van Zwol et al. |
| 2013/0195422 A1 | 8/2013 | Patil et al. |
| 2013/0201344 A1 | 8/2013 | Sweet et al. |
| 2013/0208138 A1 | 8/2013 | Li et al. |
| 2013/0208143 A1 | 8/2013 | Furuya et al. |
| 2013/0212094 A1 | 8/2013 | Naguib et al. |
| 2013/0271602 A1 | 10/2013 | Bentley et al. |
| 2013/0286244 A1 | 10/2013 | Tirpak et al. |
| 2013/0314511 A1 | 11/2013 | Chen et al. |
| 2013/0336590 A1 | 12/2013 | Sentinelli et al. |
| 2014/0002644 A1 | 1/2014 | Fedorovskaya et al. |
| 2014/0009634 A1 | 1/2014 | Hiwada et al. |
| 2014/0063300 A1 | 3/2014 | Lin et al. |
| 2014/0067955 A1 | 3/2014 | Christian |
| 2014/0074265 A1 | 3/2014 | Arginsky et al. |
| 2014/0085495 A1 | 3/2014 | Almalki et al. |
| 2014/0089401 A1 | 3/2014 | Filev et al. |
| 2014/0160326 A1 | 6/2014 | Black |
| 2014/0161348 A1 | 6/2014 | Sutherland et al. |
| 2014/0232929 A1 | 8/2014 | Ichikawa |
| 2014/0244617 A1 | 8/2014 | Rose |
| 2014/0358473 A1 | 12/2014 | Goel et al. |
| 2015/0019523 A1 | 1/2015 | Lior et al. |
| 2015/0039621 A1 | 2/2015 | Mikolajczyk et al. |
| 2015/0078680 A1 | 3/2015 | Shakib et al. |
| 2015/0078726 A1 | 3/2015 | Shakib et al. |
| 2015/0078732 A1 | 3/2015 | Shakib et al. |
| 2015/0082172 A1 | 3/2015 | Shakib et al. |

(56) References Cited

U.S. PATENT DOCUMENTS

| | | |
|---|---|---|
| 2015/0092979 A1 | 4/2015 | Meredith et al. |
| 2015/0170039 A1 | 6/2015 | Hostyn et al. |
| 2015/0179223 A1 | 6/2015 | Leppanen et al. |
| 2015/0195482 A1 | 7/2015 | Wise |
| 2015/0271405 A1 | 9/2015 | Lameer et al. |
| 2015/0288869 A1 | 10/2015 | Furuhashi |
| 2015/0309844 A1 | 10/2015 | Lowe et al. |
| 2015/0318020 A1 | 11/2015 | Pribula |
| 2015/0341546 A1 | 11/2015 | Petrescu et al. |
| 2015/0341547 A1 | 11/2015 | Petrescu et al. |
| 2015/0341548 A1 | 11/2015 | Petrescu et al. |
| 2015/0341549 A1 | 11/2015 | Petrescu et al. |
| 2015/0341550 A1 | 11/2015 | Lay |
| 2015/0341561 A1 | 11/2015 | Petrescu et al. |
| 2016/0037055 A1 | 2/2016 | Waddington |
| 2016/0050354 A1 | 2/2016 | Musatenko et al. |
| 2016/0080626 A1 | 3/2016 | Kovtun et al. |
| 2017/0236548 A1 | 8/2017 | Shakib et al. |
| 2019/0199918 A1 | 6/2019 | Petrescu et al. |
| 2021/0243363 A1 | 8/2021 | Petrescu et al. |

FOREIGN PATENT DOCUMENTS

| | | |
|---|---|---|
| CN | 101419666 | 4/2009 |
| CN | 101600051 | 12/2009 |
| CN | 101635848 | 1/2010 |
| CN | 101667248 | 3/2010 |
| CN | 101682694 | 3/2010 |
| CN | 102215372 | 10/2011 |
| CN | 102724385 | 10/2012 |
| CN | 102843511 | 12/2012 |
| CN | 103428428 | 4/2013 |
| CN | 103262169 | 8/2013 |
| CN | 103442171 | 12/2013 |
| CN | 103443795 | 12/2013 |
| CN | 103620682 | 3/2014 |
| CN | 103635967 | 3/2014 |
| CN | 103678299 | 3/2014 |
| CN | 106165391 | 11/2016 |
| CN | 106464802 | 2/2017 |
| CN | 106464803 | 2/2017 |
| EP | 2043360 | 4/2009 |
| EP | 2645700 | 3/2012 |
| EP | 2852147 | 3/2015 |
| JP | 2004272933 | 9/2004 |
| JP | 2006140892 | 6/2006 |
| JP | 2013106266 | 5/2013 |
| KR | 20070005947 | 1/2007 |
| WO | 2005099251 | 10/2005 |
| WO | 2007128114 | 11/2007 |
| WO | 2010068175 | 6/2010 |
| WO | 2012166044 | 12/2012 |
| WO | 2012167238 | 12/2012 |
| WO | 2013157859 | 10/2013 |
| WO | 2013172335 | 11/2013 |
| WO | 2015179021 | 11/2015 |
| WO | 2015179022 | 11/2015 |
| WO | 2015179023 | 11/2015 |

OTHER PUBLICATIONS

"Advisory Action", U.S. Appl. No. 11/931,828, dated May 30, 2014, 3 pages.
"Advisory Action", U.S. Appl. No. 14/450,573, dated Aug. 26, 2016, 3 pages.
"Animoto—Features", retrieved from <http://animoto.com/features> on Aug. 26, 2013, 6 pages.
"Animoto—Home", retrieved from <http://animoto.com/> on Aug. 26, 2013, 5 pages.
"Dogfooding: Highlight Reel in Gallery", Sep. 6, 2013, 11 pages.
"Final Office Action", U.S. Appl. No. 14/450,522, dated Nov. 15, 2016, 10 pages.
"Final Office Action", U.S. Appl. No. 14/450,461, dated Nov. 17, 2016, 10 pages.
"Final Office Action", U.S. Appl. No. 14/450,390, dated Oct. 31, 2016, 11 pages.
"Final Office Action", U.S. Appl. No. 14/450,573, dated May 19, 2016, 12 pages.
"Final Office Action", U.S. Appl. No. 11/931,828, dated Jan. 14, 2014, 14 pages.
"Final Office Action", U.S. Appl. No. 16/289,050, filed Feb. 24, 2020, 16 Pages.
"Final Office Action", U.S. Appl. No. 11/931,828, dated Jun. 11, 2015, 16 pages.
"Final Office Action", U.S. Appl. No. 14/450,492, dated Jun. 15, 2017, 16 pages.
"Final Office Action", U.S. Appl. No. 13/468,098, dated Sep. 18, 2015, 16 pages.
"Final Office Action", U.S. Appl. No. 11/931,828, dated May 13, 2010, 17 pages.
"Final Office Action", U.S. Appl. No. 15/582,219, dated Jan. 2, 2019, 18 pages.
"Final Office Action", U.S. Appl. No. 15/582,219, dated Nov. 1, 202019, 19 pages.
"Final Office Action", U.S. Appl. No. 14/231,573, dated May 6, 2016, 19 pages.
"Final Office Action", U.S. Appl. No. 11/931,828, dated May 6, 2016, 23 pages.
"Final Office Action", U.S. Appl. No. 14/231,546, dated Apr. 8, 2016, 25 pages.
"Final Office Action", U.S. Appl. No. 14/231,644, dated Sep. 27, 2016, 28 pages.
"Final Office Action", U.S. Appl. No. 14/231,546, dated Dec. 30, 2016, 30 pages.
"Final Office Action", U.S. Appl. No. 14/231,644, dated Jun. 16, 2017, 33 pages.
"First Action Interview Office Action", U.S. Appl. No. 16/289,050, dated Jul. 31, 2019, 3 pages.
"Foreign Office Action", CN Application No. 201911086884.6, dated Sep. 16, 2020, 12 pages.
"Foreign Office Action", EP Application No. 15716648.9, dated Oct. 12, 2020, 14 pages.
"Foreign Office Action", CN Application No. 202010816682.9, dated Jan. 25, 2022, 15 pages.
"Foreign Office Action", CN Application No. 201580016695.5, dated Nov. 18, 2019, 18 pages.
"Foreign Office Action", CN Application No. 202010816682.9, dated Jun. 29, 2021, 20 pages.
"Foreign Office Action", CN Application No. 201580016695.5, dated Apr. 2, 2019, 23 pages.
"Foreign Office Action", CN Application No. 201580016695.5, dated Aug. 2, 2018, 25 pages.
"Foreign Office Action", CN Application No. 201580025007.1, dated Oct. 11, 2019, 27 pages.
"Foreign Office Action", AU Application No. 2018203279, dated Apr. 16, 2019, 3 pages.
"Foreign Office Action", CN Application No. 201580025007.1, dated Nov. 2, 2018, 30 pages.
"Foreign Office Action", CN Application No. 201580023780.4, dated Nov. 2, 2018, 32 pages.
"Foreign Office Action", CN Application No. 201580025007.1, dated Jun. 5, 2019, 38 pages.
"Foreign Office Action", AU Application No. 20150264713, dated Mar. 4, 2018, 5 pages.
"Foreign Office Action", EP Application No. 15717718.9, dated Sep. 25, 2019, 5 pages.
"Foreign Office Action", EP Application No. 15717717.1, dated Jan. 17, 2020, 6 pages.
"Foreign Office Action", EP Application No. 15716648.9, dated May 10, 2019, 6 pages.
"Foreign Office Action", EP Application No. 15717717.1, dated May 10, 2019, 6 pages.
"Foreign Office Action", CN Application No. 201911086884.6, dated Apr. 7, 2021, 8 pages.

(56) References Cited

OTHER PUBLICATIONS

"Foreign Office Action", CN Application No. 201580025007.1, dated Feb. 3, 2020, 9 pages.
"International Preliminary Report and Written Opinion", Application No. PCT/US2013/040347, dated Nov. 20, 2014, 6 pages.
"International Search Report and Written Opinion", Application No. PCT/US2015/018869, dated May 20, 2015, 10 pages.
"International Search Report and Written Opinion", Application No. PCT/US2015/023238, dated Jun. 22, 2015, 11 pages.
"International Search Report and Written Opinion", Application No. PCT/US2015/023250, dated Jun. 22, 2015, 12 pages.
"International Search Report and Written Opinion", Application No. PCT/US2015/023241, dated Jun. 23, 2015, 12 pages.
"International Search Report and Written Opinion", Application No. PCT/US2013/040347, dated Jul. 23, 2013, 9 pages.
"Magisto—How It Works", retrieved from <http://www.magisto.com/how-it-works> on Aug. 26, 2013, 7 pages.
"New BLINK Apps Even More Creative", Jun. 18, 2013, 4 pages.
"Non-Final Office Action", U.S. Appl. No. 14/450,573, dated Dec. 23, 2015, 10 pages.
"Non-Final Office Action", U.S. Appl. No. 14/450,461, dated Mar. 23, 2017, 10 pages.
"Non-Final Office Action", U.S. Appl. No. 14/450,390, dated Apr. 8, 2016, 10 pages.
"Non-Final Office Action", U.S. Appl. No. 14/450,390, dated Feb. 23, 2017, 11 pages.
"Non-Final Office Action", U.S. Appl. No. 15/582,219, dated Aug. 3, 2018, 12 pages.
"Non-Final Office Action", U.S. Appl. No. 14/457,374, dated Nov. 13, 2015, 12 pages.
"Non-Final Office Action", U.S. Appl. No. 14/450,553, dated May 31, 2016, 12 pages.
"Non-Final Office Action", U.S. Appl. No. 14/450,522, dated May 5, 2016, 13 pages.
"Non-Final Office Action", U.S. Appl. No. 11/931,828, dated Dec. 30, 2009, 14 pages.
"Non-Final Office Action", U.S. Appl. No. 14/231,573, dated Jan. 14, 2016, 14 pages.
"Non-Final Office Action", U.S. Appl. No. 13/468,098, dated Mar. 2, 2015, 14 pages.
"Non-Final Office Action", U.S. Appl. No. 14/448,199, dated Sep. 17, 2015, 14 pages.
"Non-Final Office Action", U.S. Appl. No. 15/582,219, dated May 2, 2019, 15 pages.
"Non-Final Office Action", U.S. Appl. No. 14/450,492, dated Oct. 3, 2017, 17 pages.
"Non-Final Office Action", U.S. Appl. No. 14/231,573, dated Sep. 22, 2016, 19 pages.
"Non-Final Office Action", U.S. Appl. No. 11/931,828, dated Nov. 19, 2014, 20 pages.
"Non-Final Office Action", U.S. Appl. No. 11/931,828, dated Jul. 12, 2013, 21 pages.
"Non-Final Office Action", U.S. Appl. No. 11/931,828, dated Oct. 7, 2015, 22 pages.
"Non-Final Office Action", U.S. Appl. No. 14/231,546, dated Nov. 4, 2015, 23 pages.
"Non-Final Office Action", U.S. Appl. No. 14/231,644, dated Jun. 10, 2016, 25 pages.
"Non-Final Office Action", U.S. Appl. No. 14/231,546, dated Nov. 16, 2017, 27 pages.
"Non-Final Office Action", U.S. Appl. No. 14/231,546, dated Aug. 12, 2016, 29 pages.
"Non-Final Office Action", U.S. Appl. No. 14/231,644, dated Mar. 9, 2017, 29 pages.
"Non-Final Office Action", U.S. Appl. No. 14/231,546, dated Apr. 20, 2020, 31 pages.
"Non-Final Office Action", U.S. Appl. No. 14/218,194, dated Sep. 11, 2015, 7 pages.
"Non-Final Office Action", U.S. Appl. No. 14/450,492, dated Jan. 5, 2017, 8 pages.
"Non-Final Office Action", U.S. Appl. No. 14/231,611, dated Dec. 18, 2015, 8 pages.
"Non-Final Office Action", U.S. Appl. No. 14/487,785, dated Sep. 25, 2015, 8 pages.
"Non-Final Office Action", U.S. Appl. No. 14/450,461, dated May 6, 2016, 9 pages.
"Notice of Allowance", U.S. Appl. No. 14/450,553, dated Dec. 15, 2016, 10 pages.
"Notice of Allowance", U.S. Appl. No. 14/448,199, dated Apr. 5, 2016, 10 pages.
"Notice of Allowance", U.S. Appl. No. 14/450,573, dated Sep. 29, 2016, 11 pages.
"Notice of Allowance", U.S. Appl. No. 16/289,050, dated Jan. 22, 2021, 13 pages.
"Notice of Allowance", U.S. Appl. No. 14/457,374, dated Feb. 10, 2016, 15 pages.
"Notice of Allowance", U.S. Appl. No. 14/218,194, dated Feb. 26, 2016, 5 pages.
"Notice of Allowance", U.S. Appl. No. 14/231,611, dated Jun. 23, 2016, 7 pages.
"Notice of Allowance", U.S. Appl. No. 14/231,573, dated Jan. 13, 2017, 8 pages.
"Notice of Allowance", U.S. Appl. No. 13/468,098, dated Mar. 23, 2016, 8 pages.
"Notice of Allowance", U.S. Appl. No. 14/450,522, dated Mar. 28, 2017, 8 pages.
"Notice of Allowance", U.S. Appl. No. 14/450,390, dated May 30, 2017, 8 pages.
"Notice of Allowance", U.S. Appl. No. 14/450,461, dated Jun. 30, 2017, 8 pages.
"Notice of Allowance", U.S. Appl. No. 14/450,492, dated Nov. 1, 2018, 9 pages.
"Notice of Allowance", U.S. Appl. No. 17/234,257, dated Nov. 16, 2021, 9 pages.
"Notice of Allowance", U.S. Appl. No. 14/487,785, dated Feb. 1, 2016, 9 pages.
"Powershot SX700HS Camera User Guide", Mar. 29, 2014, 196 pages.
"Pre-Interview Communication", U.S. Appl. No. 16/289,050, dated Apr. 8, 2019, 3 pages.
"Restriction Requirement", U.S. Appl. No. 14/231,611, dated Oct. 7, 2015, 5 pages.
"Restriction Requirement", U.S. Appl. No. 14/450,461, dated Jan. 20, 2016, 6 pages.
"Restriction Requirement", U.S. Appl. No. 14/450,553, dated Jan. 7, 2016, 6 pages.
"Restriction Requirement", U.S. Appl. No. 14/450,390, dated Dec. 16, 2015, 6 pages.
"Restriction Requirement", U.S. Appl. No. 14/450,522, dated Dec. 24, 2015, 6 pages.
"Restriction Requirement", U.S. Appl. No. 14/450,492, dated Jun. 27, 2016, 6 pages.
"Restriction Requirement", U.S. Appl. No. 14/450,573, dated Sep. 1, 2015, 6 pages.
"Restriction Requirement", U.S. Appl. No. 14/231,573, dated Nov. 20, 2015, 8 pages.
Dexter, Emilie et al., "Multi-view Synchronization of Human Actions and Dynamic Scenes", In Proceedings British Machine Vision Conference, Nov. 2009, 11 pages.
Mossberg, Walter S., "Creating and Sharing Videos that are Not Too Long and Not Too Short", Wall Street Journal, Jul. 2, 2013, 5 pages.
Whitehead, Anthony et al., "Temporal Synchronization of Video Sequences in Theory and in Practice", Proceedings of the IEEE Workshop on Motion Video Computing, Jan. 2005, 6 pages.
"Foreign Office Action", CN Application No. 202010816682.9, dated Jun. 21, 2022, 7 pages.

| 500 | Receive metadata associated with capturing still images from a plurality of image-capture devices. |

| 502 | Receive the associated still images or metadata associated with image selection. |

| 504 | Receive metadata associating with capturing video from a plurality of image-capture devices. |

| 506 | Receive the associated captured video or metadata associated with video analysis. |

| 508 | Analyze the received metadata (and the received content, if available). |

| 510 | Based on the analyzing, send a recommendation to an image-capture device. |

FIG. 5

ENHANCED IMAGE CAPTURE

CROSS-REFERENCE TO RELATED APPLICATIONS

This application is a continuation application of U.S. application Ser. No. 17/234,257, filed Apr. 19, 2021, which claims priority to U.S. application Ser. No. 16/289,050, filed Feb. 28, 2019, now U.S. Pat. No. 11,019,252, issued May 25, 2021, which claims priority under 35 U.S.C. § 120 to U.S. patent application Ser. No. 14/450,492, filed Aug. 4, 2014, now U.S. Pat. No. 10,250,799, issued Apr. 2, 2019, which claims priority to U.S. Provisional Patent Application 62/001,327, filed on May 21, 2014, the disclosures of which are incorporated herein by reference.

The present application is additionally related to U.S. patent application Ser. Nos. 14/450,390, 14/450,461, 14/450,522, 14/450,553, and 14/450,573, all filed on Aug. 4, 2014.

TECHNICAL FIELD

The present disclosure is related generally to still-image and video capture and, more particularly, to digital image processing.

BACKGROUND

On average, people discard a large number of the pictures they take as unsatisfactory. In many cases, this is because the main subject is blinking, moving (i.e., is too blurry), or not smiling at the moment of image capture. In other cases, the photographer is inadvertently moving the image-capture device at the capture moment (e.g., due to an unsteady hand or to an involuntary rotation of the device). Some pictures are discarded because the image-capture settings are inappropriate (e.g., the settings do not accommodate a low-light situation).

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 5 is a flowchart of a representative method for a remote server that assists an image-capture device;

DETAILED DESCRIPTION

Figure 1A:
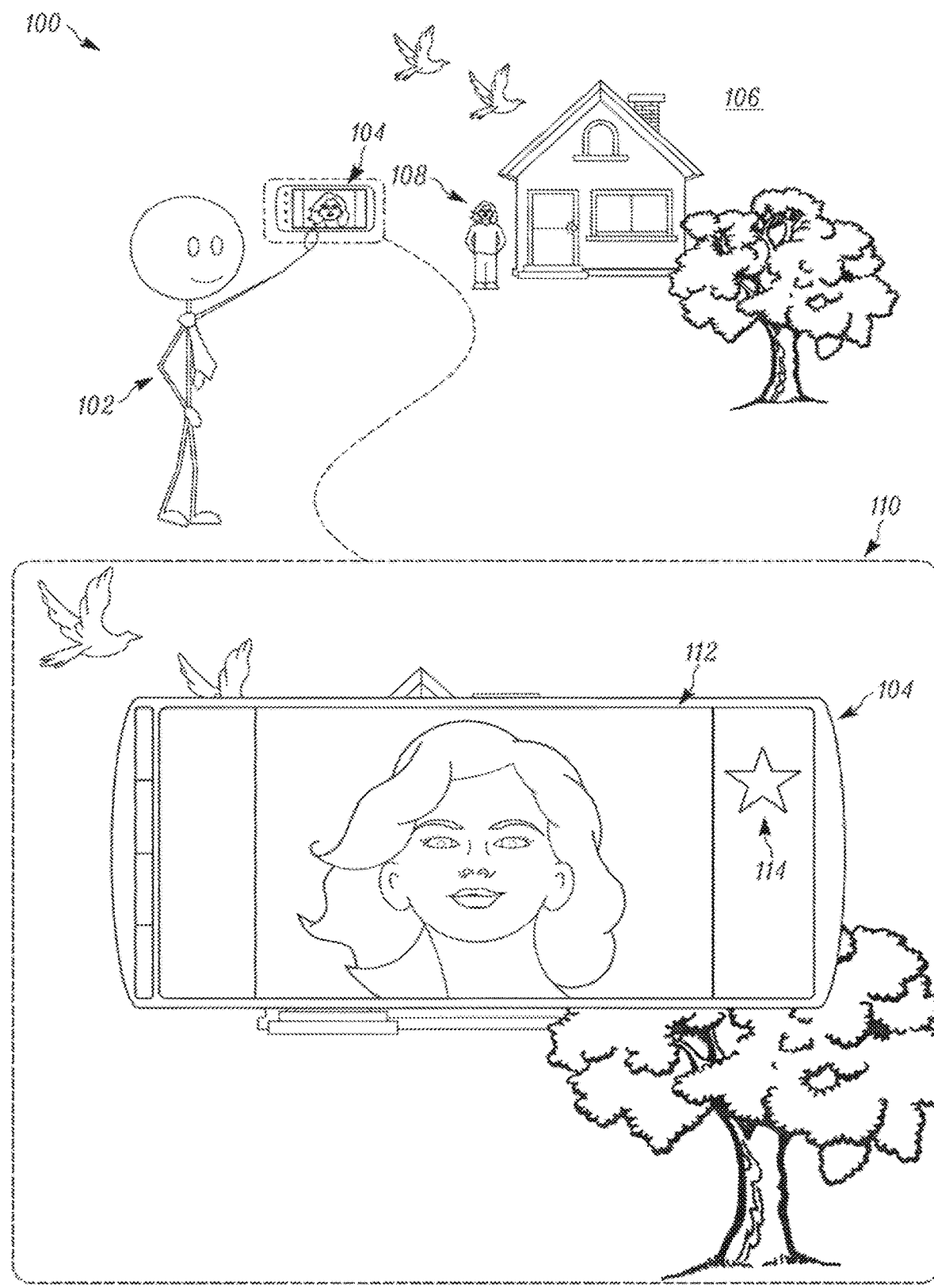
FIG. 1A is an overview of a representative environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The inventors believe that photographers would like, in addition to getting the best possible photographs, more than one picture to capture the moment, and, in some cases, a few seconds of video associated with a still picture. This later should be accomplished without the photographer having to spend the time to switch between still-capture mode and video-capture mode.

Aspects of the presently disclosed techniques provide a "best" picture taken within a few seconds of the moment when a capture command is received (e.g., when the "shutter" button is pressed). Also, several seconds of video are captured around the same time and are made available to the photographer. More specifically, in some embodiments, several still images are automatically (that is, without the user's input) captured. These images are compared to find a "best" image that is presented to the photographer for consideration. Video is also captured automatically and analyzed to see if there is an action scene or other motion content around the time of the capture command. If the analysis reveals anything interesting, then the video clip is presented to the photographer. The video clip may be cropped to match the still-capture scene and to remove transitory parts. In further embodiments, better low-light images are provided by enhancing exposure control. Higher-precision horizon detection may be provided based on motion analysis.

For a more detailed analysis, turn first to FIG. 1A. In this example environment 100, a photographer 102 (also sometimes called the "user" in this discussion) wields his camera 104 to take a still image of the "scene" 106. In this example, the photographer 102 wants to take a snapshot that captures his friend 108.

The view that the photographer 102 actually sees is depicted as 110, expanded in the bottom half of FIG. 1A. Specifically, when the photographer 102 pushes a "capture" button (also called the "shutter" for historical reasons), the camera 104 captures an image and displays that captured image in the viewfinder display 112. So far, this should be very familiar to anyone who has ever taken a picture with a smartphone or with a camera that has a large viewfinder display 112. In the example of FIG. 1A, however, the camera 104 also displays a "notification icon" 114 to the photographer 102. While the detailed functioning supporting this icon 114 is discussed at length below, in short, this icon 114 tells the photographer 102 that the camera 104 believes that it has either captured a "better" still image than the one displayed in the viewfinder display 112 or that it has captured a video that may be of interest to the photographer 102.

Figure 1B:
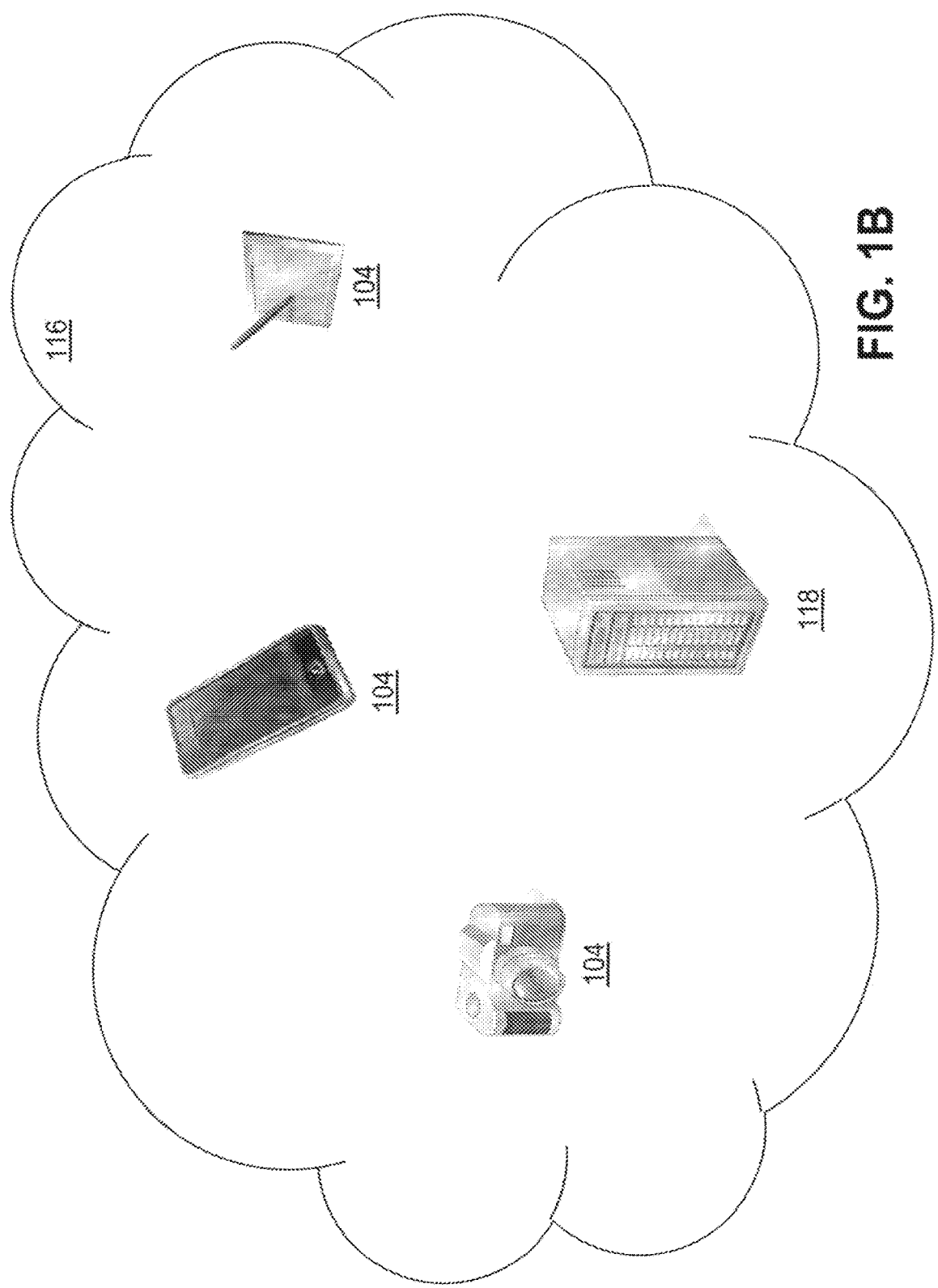
FIG. 1B is an overview of a representative network that supports certain of the present techniques.

FIG. 1B introduces a network 116 (e.g., the Internet) and a remote server 118. The discussion below shows how these can be used to expand upon the sample situation of FIG. 1A. FIG. 1B also visually makes the point that the "camera" 104 need not actually be a dedicated camera: It could be any image-capture device including a video camera, a tablet computer, smartphone, and the like. For clarity's sake, the present discussion continues to call the image-capture device 104 a "camera."

Figure 2:
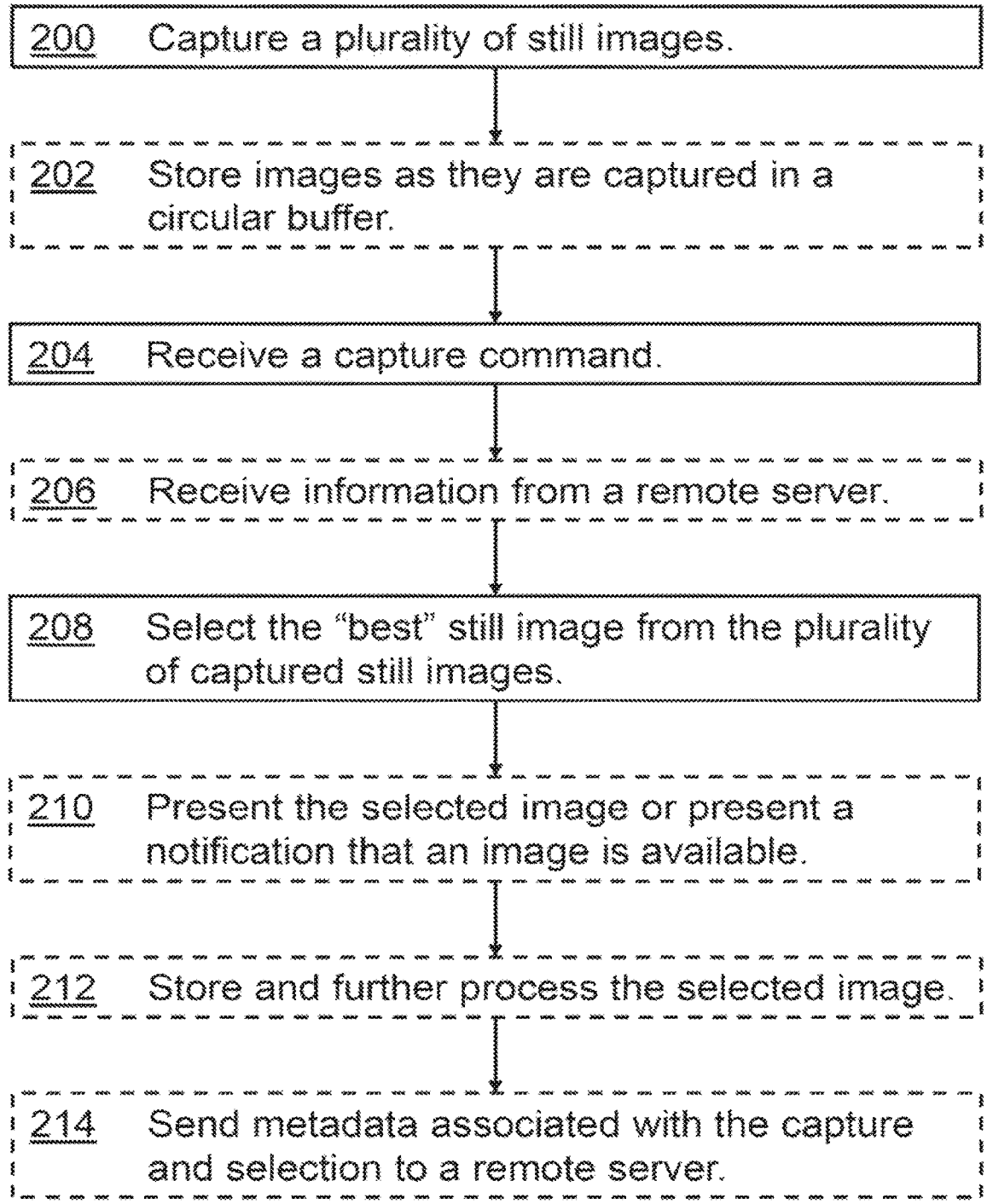
FIG. 2 is a flowchart of a representative method for selecting and presenting a "best" captured still image.

FIG. 2 presents methods for specific techniques that enhance still-image capture. In step 200, the camera 104 captures a number of still images. Consider, for example, the photographer 102 putting the camera 104 into "viewfinder" mode. In this mode, the camera's viewfinder 112 displays the image "seen" by the camera 104. The photographer 102 may explicitly command the camera 104 to enter this mode, or the camera 104 can automatically enter this mode when it determines that this mode is desired (e.g., by monitoring the camera's current position and observing the behavior of the photographer 102).

In any case, the camera 104 automatically (that is, while still in viewfinder mode and not in response to an explicit command from the photographer 102) captures a number of still images, e.g., five per second over a period of a couple of seconds. These captured still images are stored by the camera 104.

In taking so many images, memory storage often becomes an issue. In some embodiments, the images are stored in a circular buffer (optional step 202) holding, say, ten seconds of still images. Because the capacity of the circular buffer is finite, the buffer may be continuously refreshed with the latest image replacing the earliest one in the buffer. Thus, the buffer stores a number of captured still images ranging in time from the newest image back to the oldest, the number of images in the buffer depending upon the size of the buffer. In some embodiments, the selection process (see the discussion of step 208 below) is performed continuously on the set of images contained in the circular buffer. Images that are not very good (as judged by the techniques discussed below) are discarded, further freeing up space in the circular buffer and leaving only the "best" images captured over the past, say, three seconds. Even in this case, the metadata associated with discarded images are kept for evaluation.

Note that the capture rate of images in step 200 may be configurable by the photographer 102 or may depend upon an analysis of the photographer's previous behavior or even upon an analysis of the captured images themselves. If, for example, a comparison of one image to another indicates a significant amount of movement in the captured scene, then maybe the camera 104 is focused on a sporting event, and it should increase its capture rate. The capture rate could also depend upon the resources available to the camera 104. Thus, if the camera's battery is running low, then it may reduce the capture rate to conserve energy. In extreme cases, the technique of automatic capture can be turned off when resources are scarce.

At step 204 (generally while the camera 104 continues to automatically capture still images), the photographer 102 gives a capture command to the camera 104. As mentioned above, this can result from the photographer 102 pressing a shutter button on the camera 104. (In general, the capture command can be a command to capture one still image or a command to capture a video.)

(For purposes of the present discussion, when the camera 104 receives the capture command, it exits the viewfinder mode temporarily and enters the "capture" mode. Once the requested still image (or video as discussed below) is captured, the camera 104 generally re-enters viewfinder mode and continues to automatically capture images per step 200.)

Unlike in the technique of step 200, traditional cameras stay in the viewfinder mode without capturing images until they receive a capture command They then capture the current image and store it. A camera 104 acting according to the present techniques, however, is already capturing and storing images (steps 200 and 202) even while it is still in the viewfinder mode. One way of thinking about the present techniques is to consider the capture command of step 204 not to be a command at all but rather to be an indication given by the photographer 102 to the camera 104 that the photographer 102 is interested in something that he is seeing in the viewfinder display 112. The camera 104 then acts accordingly (that is, it acts according to the remainder of the flowchart of FIG. 2.)

Step 206 is discussed below in conjunction with the discussion of step 214.

In step 208, the camera 104 reviews the images it has captured (which may include images captured shortly before or shortly after the capture command is received) and selects a "best" one (or a "best" several in some embodiments). (In some embodiments, this selection process is performed on partially processed, or "raw," images.) Many different factors can be reviewed during this analysis. As mentioned above, the capture command can be considered to be an indication that the photographer 102 is interested in what he sees. Thus, a very short time interval between the capture command and the time that a particular image was captured means that that particular image is likely to be of something that the photographer 102 wants to record, and, thus, this time interval is a factor in determining which image is "best."

Various embodiments use various sets of information in deciding which of the captured images is "best." In addition to temporal proximity to the photographer's capture command, some embodiments use motion-sensor data (from an accelerometer, gyroscope, orientation, or GPS receiver on the camera 104) (e.g., was the camera 104 moving when this image was captured?), face-detection information (face detection, position, smile and blink detection) (i.e., easy-to-detect faces often make for good snapshots), pixel-frame statistics (e.g., statistics of luminance: gradient mean, image to image difference), activity detection, data from other sensors on the camera 104, and scene analysis. Further information, sometimes available, can include a stated preference of the photographer 102, past behavior of the photographer 102 (e.g., this photographer 102 tends to keep pictures with prominent facial images), and a privacy setting (e.g., do not keep pictures with a prominent face of a person who is not in a list of contacts for the camera 104). Also, often available are camera 104 metadata and camera-status information. All such data can be produced in the camera 104 and stored as metadata associated with the captured images.

These metadata may also include reduced resolution versions of the captured images which can be used for motion detection within the captured scene. Motion detection provides information which is used for "best" picture selection (and analysis of captured video, see discussion below), as well as other features which improve the image-capture experience.

The statistics and motion-detection results can also be used by an exposure procedure to improve captured-image quality in low light by, for example, changing exposure parameters and flash lighting. When there is motion in low light and strobe lighting is available from the camera 104, the strobe may be controlled such that multiple images can be captured with correct exposures and then analyzed to select the best exposure.

However, the "best" captured image is selected, that best image is presented to the photographer 102 is step 210.

There are several possible ways of doing this. Many embodiments are intended to be completely "transparent" from the photographer's perspective, that is, the photographer 102 simply "snaps" the shutter and is presented with the selected best image, whether or not that is actually the image captured at the time of the shutter command.

Consider again the situation of FIG. 1A. When the photographer 102 presses the shutter button (step 204), the viewfinder display 112 is as shown in FIG. 1A. Clearly, the photographer 102 wants a picture of the face of his friend 108. The system can review the captured images from, say a second before to a second after the capture command is received, analyze them, and then select the best one. Here, that would be an image that is in focus, in which the friend 108 is looking at the camera 104, has her eyes open, etc. That best image is presented to the photographer 102 when he presses the shutter button even if the image captured at the exact time of the shutter press is not as good.

A slightly more complicated user interface presents the photographer 102 with the image captured when the shutter command was received (as is traditional) and then, if that image is not the best available, presents the photographer 102 with an indication (114 in FIG. 1A) that a "better" image is available for the photographer's consideration. Again, considering the situation of FIG. 1A, maybe his friend 108 blinks at the time of the capture command That 'blinking" image is presented to the photographer 102, but the indication 114 is lit to show that other, possibly better, images are available for the photographer's review.

Other variations on the user interface are possible. The choice of which to use in a given situation can be based on settings made by the photographer 102, on an analysis of the photographer's past behavior (e.g., is he a "snapshot tourist," or does he act more like an experienced photographer?), and on analysis of the captured scene.

In optional step 212, the selected image is further processed, if necessary, and copied to a more permanent storage area.

In some embodiments, the metadata associated with the captured images (possibly including what the photographer 102 eventually does with the images) are sent (step 214) to a remote server device (118 of FIG. 1B). The work of the remote server 118 is discussed in greater detail below with reference to FIG. 5, but briefly, the remote server 118 analyzes the information, potentially from multiple image-capture devices 104, looking for trends and for "best practices." It then encapsulates what it has learned and sends recommendations to cameras 104 (step 206). The cameras 104 are free to use these recommendations when they select images in step 208.

Figure 3:
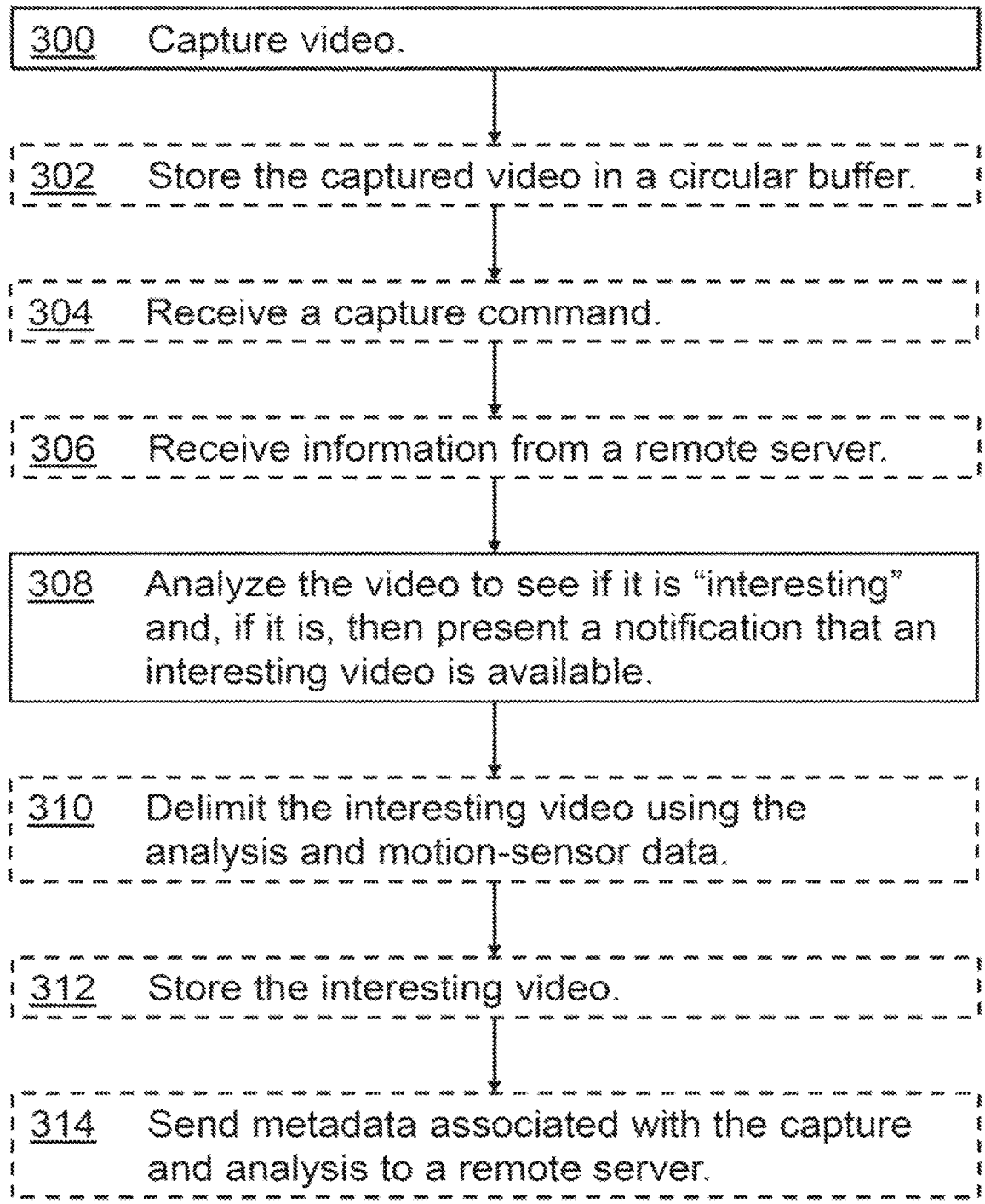
FIG. 3 is a flowchart of a representative method for capturing an "interesting" video.

FIG. 3 presents other methods for enhancing image-capture, this time for video images. The method of FIG. 3 can be performed separately from, or in conjunction with, the methods of FIG. 2.

In step 300, the camera 104 captures video while the camera 104 is in viewfinder mode (that is, as described above, while the camera 104 has not received an explicit command to capture video). As with still-image capture, parameters of the video capture can be altered to reflect the resources (e.g., battery, memory storage) available on the camera 104.

In some embodiments, the captured video is, at this point, simply a time sequence of "raw," unprocessed images. (These raw images can be further processed as necessary later: See the discussion of step 312 below.) The storage issues mentioned above for still images are exacerbated for video, so, again, a circular buffer is recommended for storing the video as it is captured (step 302). The latest video images (also called "frames") replace the oldest ones so that at any time, the circular buffer has, for example, the last twenty seconds of captured video.

Optionally, a capture command is received in step 304. As discussed above, this is not treated as an actual command, but rather as an indication given by the photographer 102 to the camera 104 that the photographer 102 is interested in something that he is seeing in the viewfinder display 112.

Whether a capture command has been received or not, the captured video is continuously analyzed (step 308) to see if it is "interesting." While the photographer 102 can indicate his interest by pressing the shutter, other information can be used in addition to (or instead of) that, such as activity detection, intra-frame and inter-frame motion, and face detection. For example, a sudden surge of activity combined with a clearly recognizable face may indicate an interesting situation. As with still-image capture, photographer 102 preferences, past behavior, and privacy settings can also be used in a machine-learning sense to know what this photographer 102 finds interesting.

If a segment (also called a "clip") of captured video has been found to be potentially interesting (e.g., if an "interest score" for a video clip is above a set threshold), then the photographer 102 is notified of this in step 308. The photographer 102 may then review the indicated video clip to see if he too finds it to be of interest. If so, then the video clip is further processed as necessary (e.g., by applying video-compression techniques) and copied into longer-term storage (step 312).

As a refinement, the limits of the interesting video clip can be determined using the same analysis techniques described above along with applying motion-sensor data. For example, the starting point of the clip can be set shortly before something interesting begins to occur.

Also, as with the still-image embodiments, metadata can be sent to the remote server 118 (step 314). Recommendations and refined operational parameters, based on analysis performed by the remote server 118, can be received (step 306) and used in the analysis of step 308.

Note that from the description above, in some embodiments and in some situations, the camera 104 captures and presents video without ever leaving the viewfinder mode. That is, the camera 104 views the scene, delimits video clips of interest, and notifies the photographer 102 of these video clips without ever receiving any explicit command to do so. In other embodiments, these video-capture and analysis techniques can be explicitly invoked or disabled by the photographer 102.

Figure 4:
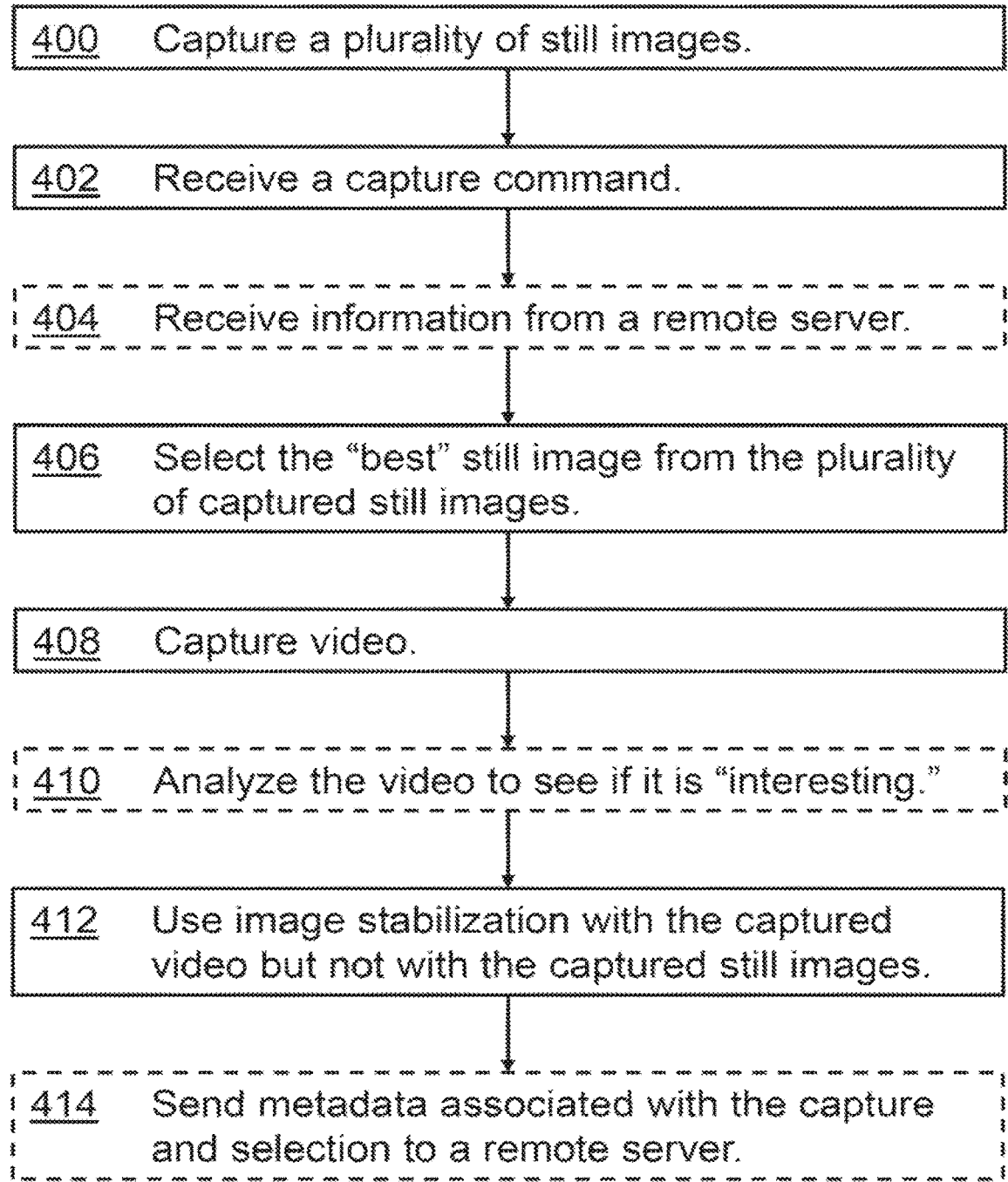
FIG. 4 is a flowchart of a representative method for selecting a "best" captured still image and for capturing an "interesting" video.

As mentioned above in the introduction to the discussion of FIG. 3, the still-image capture-enhancement techniques of FIG. 2 can be combined with the video-image capture-enhancement techniques of FIG. 3. FIG. 4 presents such a combination with some interesting refinements.

Consider once again the scenario of FIG. 1A. The camera 104 is in viewfinder mode, capturing both still images (step 400, as per step 200 of FIG. 2) and video (step 408, as in step 300 of FIG. 3). In the proper circumstances, the system presents both the best captured still image (step 406) and interesting video (step 410) for the photographer's consideration (possibly using the time of the capture command of step 402 to select and analyze the captured images and frames).

Even though still images and video frames can be captured at the same time, the refinement of FIG. 4 applies image-stabilization techniques to the captured video but not to the captured still images (step 412). This provides both better video and better stills than would any known "compromise" system that does the same processing for both stills and video.

In another refinement, the selection of the best still image (step 406) can depend, in part, on the analysis of the video (step 410) and vice versa. Consider a high-motion sports scene. The most important scenes may be best determined from analyzing the video because that will best show the action. From this, the time of the most interesting moment is determined. That determination may alter the selection process of the best still image. Thus, a still image taken at the moment when a player kicks the winning goal may be selected as the best image, even though other factors may have to be compromised (e.g. the player's face is not clearly visible in that image). Going in the other direction, a video clip may be determined to be interesting simply because it contains an excellent view of a person's face even though that person is not doing anything extraordinary during the video.

Specifically, all of the metadata used in still-image selection can be used in combination with all of the metadata used in video analysis and delimitation. The combined metadata set can then be used to both select the best still image and to determine whether or not a video clip is interesting.

The methods of FIG. 4 can also include refinements in the use of the remote server 118 (steps 404 and 414). These refinements are discussed below in reference to FIG. 5.

Methods of operation of the remote server 118 are illustrated in FIG. 5. As discussed above, the server 118 receives metadata associated with still-image selection (step 500; see also step 214 of FIG. 2 and step 414 of FIG. 4). The same server 118 may also receive metadata associated with analyzing videos to see if they are interesting (step 504; see also step 314 of FIG. 3 and step 414 of FIG. 4). The server 118 can analyze these two data sets separately (step 508) and provide still-image selection recommendations (step 510) and video-analysis recommendations (step 510) to various image-capture devices 104.

In some embodiments, however, the remote server 118 can do more. First, in addition to analyzing metadata, it can further analyze the data themselves (that is, the actual captured still images and video) if that content is made available to it by the image-capture devices 104 (steps 502 and 506). With the metadata and the captured content, the server 118 can perform the same kind of selection and analysis performed locally by the image-capture devices 104 themselves (see step 208 of FIG. 2; steps 308 and 310 of FIG. 3; and steps 406 and 410 of FIG. 4). Rather than simply providing a means for second-guessing the local devices 104, the server 118 can compare its own selections and interest scores against those locally generated and thus refine its own techniques to better match those in the general population of image-capture devices 104.

Further, the image-capture device 104 can tell the remote server 118 just what the photographer 102 did with the selected still images and the video clips thought to be interesting (steps 502 and 506). Again, the server 118 can use this to further improve its recommendation models. If, for example, photographers 102 very often discard those still images selected as best by the techniques described above, then it is clear that those techniques may need to be improved. The server 118 may be able to compare an image actually kept by the photographer 102 against the image selected by the system and, by analyzing over a large population set, learn better how to select the "best" image.

Going still further, the remote server 118 can analyze the still-image-selection metadata (and, if available, the still images themselves and the photographer's ultimate disposition of the still images) together with the video-analysis metadata (and, if available, the video clips themselves and the photographer's ultimate disposition of the captured video). This is similar to the cross-pollination concept discussed above with respect to FIG. 4: That is, by combining the analysis of still images and video, the server 118 can further improve its recommendations for both selecting still images and for analyzing video clips. The particular methodologies usable here are well known from the arts of pattern analysis and machine learning.

In sum, if the remote server 118 is given access to information about the selections and analyses of multiple image-capture devices 104, then from working with that information, the server 118 can provide better recommendations, either generically or tailored to particular photographers 102 and situations.

Figure 6:
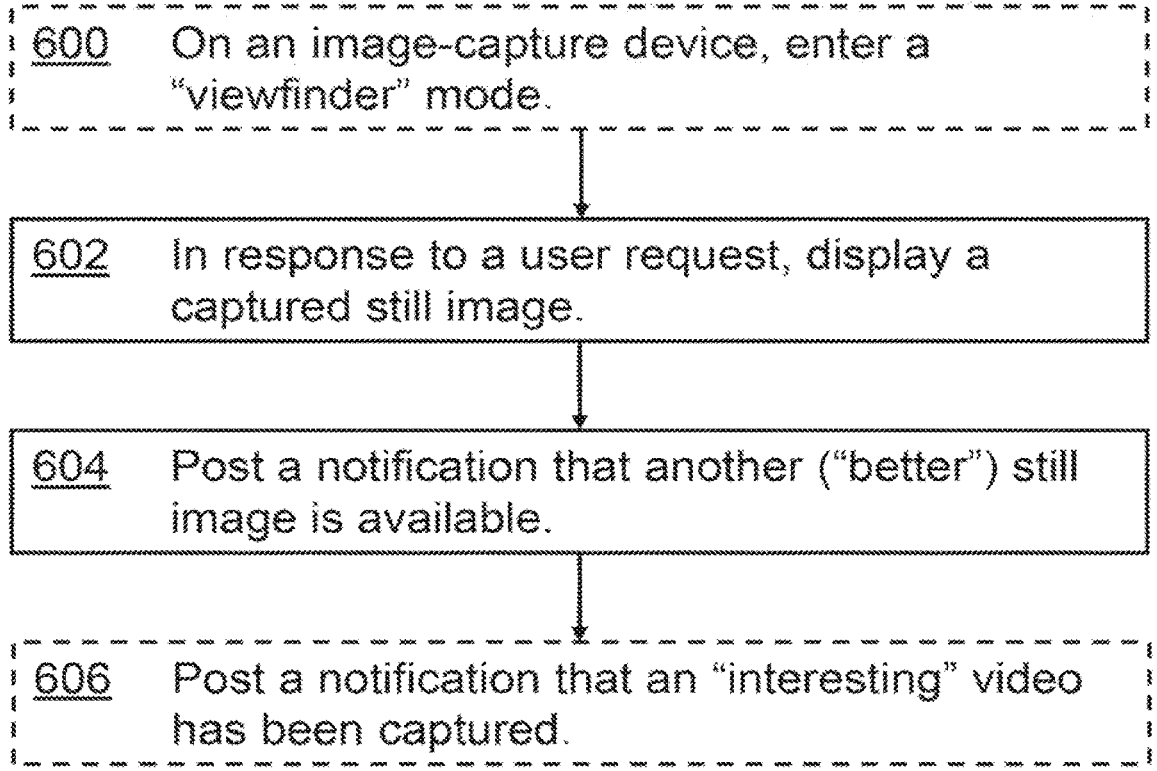
FIG. 6 is a flowchart of representative methods for notifying a user that a "better" still image or an "interesting" video is available.

FIG. 6 presents methods for a user interface applicable to the presently discussed techniques. Much of the user-interface functionality has already been discussed above, so only a few points are discussed in any detail here.

In step 600, the camera 104 optionally enters the viewfinder mode wherein the camera 104 displays what it sees in the viewfinder display 112. As mentioned above with reference to FIG. 2, the photographer 102 may explicitly command the camera 104 to enter this mode, or the camera 104 can automatically enter this mode when it determines that this mode is desired.

In a first embodiment of step 602, the photographer 102 presses the shutter button (that is, submits an image-capture command to the camera 104), the camera 104 momentarily enters the image-capture mode, displays a captured image in the viewfinder display 112, and then re-enters viewfinder mode. In a second embodiment, the photographer puts the camera 104 into another mode (e.g., a "gallery" mode) where it displays already captured images, including images automatically captured.

As discussed above, the displayed image can either be one captured directly in response to an image-capture command or could be a "better" image as selected by the techniques discussed above. If there is a captured image that is better than the one displayed, then the photographer 102 is notified of this (step 604). The notification can be visual (e.g., by the icon 114 of FIG. 1A), aural, or even haptic. In some cases, the notification is a small version of the better image itself. If the photographer 102 clicks on the small version, then the full image is presented in the viewfinder display 112 for his consideration. While the camera 104 is in gallery mode, the photographer 102 can be notified of which images are "better" by highlighting them in some way, for example by surrounding them with a distinctive border or showing them first.

Meanwhile, a different user notification can be posted if the techniques above capture a video clip deemed to be interesting. Again, several types of notification are possible, including a small still from the video (or even a presentation of the video itself).

Other user interfaces are possible. While the techniques described above for selecting a still image and for analyzing a video clip are quite sophisticated, they allow for a very simple user interface, in some cases an interface completely transparent to the photographer 102 (e.g., just show the best captured still image when the photographer 102 presses the shutter button). More sophisticated user interfaces are appropriate for more sophisticated photographers 102.

Figure 7:
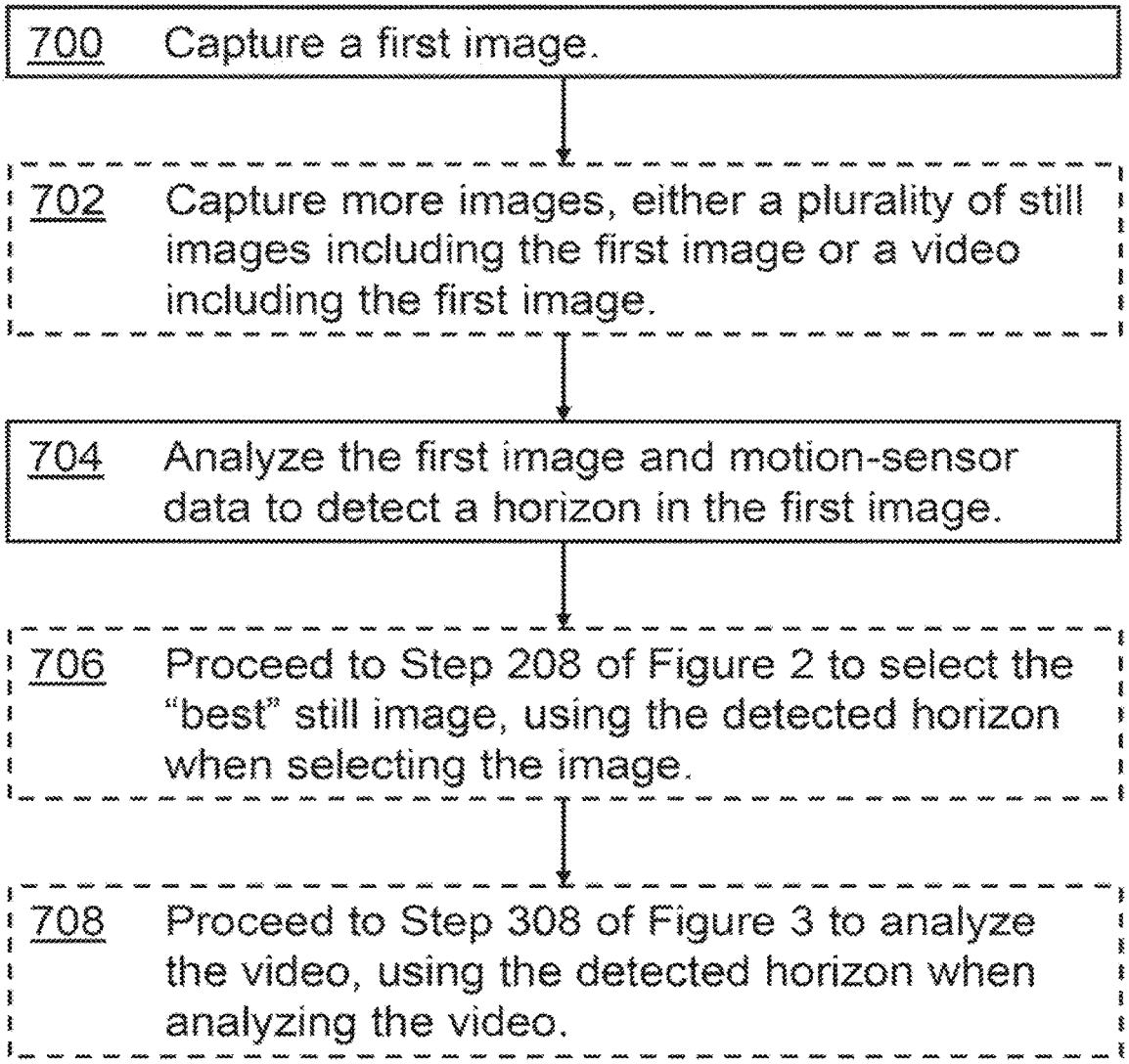
FIG. 7 is a flowchart of a representative method for detecting a horizon in a captured image and then using the detected horizon.

FIG. 7 presents a refinement that can be used with any of the techniques described above. A first image (a still or a frame of a video) is captured in step 700. Optionally, additional images are captured in step 702.

In step 704, the first image is analyzed (e.g., looking for horizontal or vertical lines). Also, motion-sensor data from the camera 104 are analyzed to try to determine the horizon in the first image.

Once the horizon has been detected, it can be used as input when selecting other images captured close in time to the first image. For example, the detected horizon can tell how level the camera 104 was held when an image was captured, and that can be a factor in determining whether that image is better than another. Also, the detected horizon can be used when post-processing images to rotate them into level or to otherwise adjust them for involuntary rotation.

Figure 8:
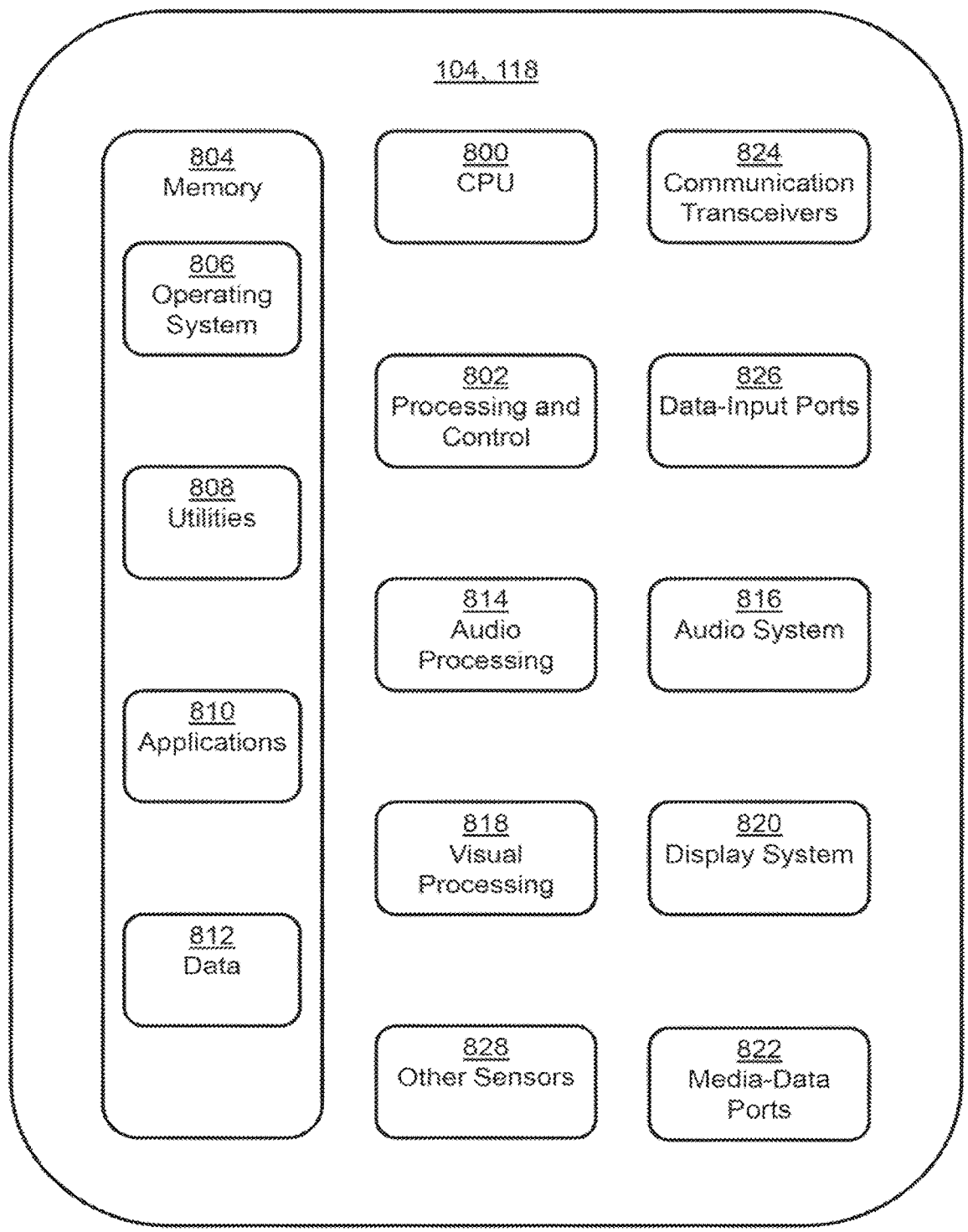
FIG. 8 is a schematic showing various components of a representative image-capture device or server.

FIG. 8 shows the major components of a representative camera 104 or server 118. The camera 104 could be, for example, a smartphone, tablet, personal computer, electronic book, or dedicated camera. The server 118 could be a personal computer, a compute server, or a coordinated group of compute servers.

The central processing unit ("CPU") 800 of the camera 104 or server 118 includes one or more processors (i.e., any of microprocessors, controllers, and the like) or a processor and memory system which processes computer-executable instructions to control the operation of the device 104, 118. In particular, the CPU 800 supports aspects of the present disclosure as illustrated in FIGS. 1 through 7, discussed above. The device 104, 118 can be implemented with a combination of software, hardware, firmware, and fixed-logic circuitry implemented in connection with processing and control circuits, generally identified at 802. Although not shown, the device 104, 118 can include a system bus or data-transfer system that couples the various components within the device 104, 118. A system bus can include any combination of different bus structures, such as a memory bus or memory controller, a peripheral bus, a universal serial bus, and a processor or local bus that utilizes any of a variety of bus architectures.

The camera 104 or server 118 also includes one or more memory devices 804 that enable data storage (including the circular buffers described in reference to FIGS. 2 through 4), examples of which include random-access memory, non-volatile memory (e.g., read-only memory, flash memory, erasable programmable read-only memory, and electrically erasable programmable read-only memory), and a disk storage device. A disk storage device may be implemented as any type of magnetic or optical storage device, such as a hard disk drive, a recordable or rewriteable disc, any type of a digital versatile disc, and the like. The device 104, 118 may also include a mass-storage media device.

The memory system 804 provides data-storage mechanisms to store device data 812, other types of information and data, and various device applications 810. An operating system 806 can be maintained as software instructions within the memory 804 and executed by the CPU 800. The device applications 810 may also include a device manager, such as any form of a control application or software application. The utilities 808 may include a signal-processing and control module, code that is native to a particular component of the camera 104 or server 118, a hardware-abstraction layer for a particular component, and so on.

The camera 104 or server 118 can also include an audio-processing system 814 that processes audio data and controls an audio system 816 (which may include, for example, speakers). A visual-processing system 818 processes graphics commands and visual data and controls a display system 820 that can include, for example, a display screen 112. The audio system 816 and the display system 820 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 822. In some implementations, the audio system 816 and the display system 820 are components external to the device 104, 118. Alternatively (e.g., in a cellular telephone), these systems 816, 820 are integrated components of the device 104, 118.

The camera 104 or server 118 can include a communications interface which includes communication transceivers 824 that enable wired or wireless communication. Example transceivers 824 include Wireless Personal Area Network radios compliant with various Institute of Electrical and Electronics Engineers ("IEEE") 802.15 standards, Wireless Local Area Network radios compliant with any of the various IEEE 802.11 standards, Wireless Wide Area Network cellular radios compliant with 3rd Generation Partnership Project standards, Wireless Metropolitan Area Network radios compliant with various IEEE 802.16 standards, and wired Local Area Network Ethernet transceivers.

The camera 104 or server 118 may also include one or more data-input ports 826 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 826 may include Universal Serial Bus ports, coaxial-cable ports, and other serial or parallel connectors (including internal connectors) for flash memory, storage disks, and the like. These data-input ports 826 may be used to couple the device 104, 118 to components, peripherals, or accessories such as microphones and cameras.

Finally, the camera 104 or server 118 may include any number of "other sensors" 828. These sensors 828 can include, for example, accelerometers, a GPS receiver, compass, magnetic-field sensor, and the like.

The remainder of this discussion presents details of choices and procedures that can be used in certain implementations. Although quite specific, these details are given so that the reader can more fully understand the broad concepts discussed above. These implementation choices are not intended to limit the scope of the claimed invention in any way.

Many techniques can be used to evaluate still images in order to select the "best" one (step 208 of FIG. 2). For images that contain faces, one embodiment calculates an image score based on sharpness and exposure and calculates a separate score for facial features.

First, facial-recognition techniques are applied to the captured images to see if many of them contain faces. If so, then the scene being captured is evaluated as a "face" scene. If the scene is not a face scene, then the sharpness/exposure score is used by itself to select the best image. For a face scene, on the other hand, if the images available for evaluation (that is, the set of all captured images that are reasonably close in time to the capture command) have very similar sharpness/exposure scores (e.g., the scores are equal within a similarity threshold which can be specific to the hardware used), then the best image is selected based purely on the face score.

For a face scene when the set of images have significant differences in their sharpness/exposure scores, then the best image is the one that has the highest combination score based on both the sharpness/exposure score and the face score. The combination score may be a sum or weighted sum of the two scores:

picture $e_{score}(i)$=mFEscore($i$)+total$_{faces}(i)$

The sharpness/exposure score can be calculated using the mean of the Sobel gradient measure for all pixels in the image and the mean pixel difference between the image being analyzed and the immediately preceding image. Luminance-only data are used in these calculations. The frame-gradient metric and frame-difference metric are calculated as:

$$mSobel = \frac{1}{WH}\sum_{i=1}^{W}\sum_{j=1}^{H} 0.5 * (abs(Sobel\_x(i,j)) + abs(Sobel\_y(i,j)))$$

$$mDiff = \frac{1}{WH}\sum_{i=1}^{W}\sum_{j=1}^{H} abs(Y_t(i,j,t) - Y_{t-1}(i,j))$$

where:
W=image width;
H=image height;
Sobel_x=The result of convolution of the image with the Sobel Gx operator:

$$G_x = \begin{bmatrix} -1 & 0 & 1 \\ -2 & 0 & 2 \\ -1 & 0 & 1 \end{bmatrix}$$

Sobel_y=The result of convolution of the image with the Sobel Gy operator:

$$G_y = \begin{bmatrix} 1 & 2 & 1 \\ 0 & 0 & 0 \\ -1 & -2 & -1 \end{bmatrix}$$

The sharpness/exposure score is calculated for each image (i) in the circular image buffer of N images around the capture moment using the Sobel value and its minimum:

$$mFEscore(i) = \left(mSobel(i) - \min_{N}(mSobel) + 1\right) * \left(1 - \frac{mDiff(i)}{200}\right)$$

The mFEscore is set to 0 for any image if the mean of all pixel values in the image is not within a normal exposure range or if the focus state indicates that the image is out-of-focus. The sharpness/exposure score values for the set of available images are then normalized to a range of, say, 0 to 100 to be used in conjunction with face scores, when a face scene is detected.

The face score is calculated for the images when at least one face is detected. For each face, the score consists of a weighted sum of detected-smile score, open-eyes score, and face-orientation score. For example:
Smile: Values range from 1 to 100 with large values for a wide smile, small values for no smile.
Eyes Open: Values range from 1 to 100 with small values for wide-open eyes, large values for closed eyes (e.g., a blink). Values are provided for each eye separately.

A separate blink detector may also be used.
Face Orientation (Gaze): An angle from 0 for a frontal look to +/−45 for a sideways look.

The procedure uses face-detection-engine values and creates normalized scores for each of the face parameters as follows:
Smile Score: Use the smile value from the engine; then normalize to a 1 to 100 range for the set of N available images as follows:

$$smile(i) = \frac{smile(i) - \min_{N}(smile)}{\max_{N}(smile) - \min_{N}(smile)}$$

Eyes-Open Score: Detect the presence of a blink or half-opened eyes using the blink detector and a change-of-eyes parameters between consecutive frames; score 0 for images when a blink or half-open eye is detected. For the rest of the images, a score is calculated using the average of the values for both eyes and normalizing to the range in a manner similar to that described for a smile. The maximum score is obtained when the eyes are widest open over the N images in the analysis.
Face-Orientation Score (Gaze): Use a maximum score for a frontal gaze and reduce the score when the face is looking sideways For each face in the image, a face score is calculated as a weighted sum:

face$_{score}$=α*smile+β*eyes+π*gaze

If there are more faces than one in an image, then an average or weighted average of all face scores can be used to calculate the total face score for that image. The weights used to calculate total face score could correlate to the face size, such that larger faces have higher score contributions to the total face score. In another embodiment, weights correlate with face priority determined through position or by some face-recognition engine. For an image (i) with M faces, the total faces score then may be calculated as:

$$total_{faces}(i) = \frac{\sum_{j=1}^{M} w_j * face_{score}(j)}{\sum_{j=1}^{M} w_j}$$

As discussed above, the face score can then be combined (as appropriate) with the sharpness/exposure score, and the image with the highest score is selected as the "best" image. As a refinement, in some embodiments, the selected image is then compared against the "captured" image (that is, the image captured closest in time to the time of the capture command). If these images are too similar, then only the captured image is presented to the user. This consideration is generally applicable because studies have shown that photographers do not prefer the selected "best" image when its differences from the captured image are quite small.

As with selecting a "best" image, many techniques can be applied to determine whether or not a captured video is "interesting." Generally, the video-analysis procedure runs in real time, constantly marking video frames as interesting or not. Also, the video analysis determines where the interesting video clip begins and ends. Some metrics useful in video analysis include region of interest, motion vectors ("MVs"), device motion, face information, and frame statistics. These metrics are calculated per frame and associated with the frame.

In some embodiments, a device-motion detection procedure combines data from a gyroscope, accelerometer, and magnetometer to calculate device movement and device position, possibly using a complementary filter or Kalman filter. The results are categorized as follows:

NO_MOTION means that the device is either not moving or is experiencing only a small level of handshake;
INTENTIONAL_MOTION means that the device has been intentional moved (e.g., the photographer is panning); and
UNINTENTIONAL_MOTION means that the device has experienced large motion that was not intended as input to the image-capture system (e.g., the device was dropped, pulled out of a pocket, etc.).

By comparing consecutive values of the calculated position, the device's motion in three spatial axes is characterized:
if (delta position of all 3-axis<NO_MOVEMENT_THRESHOLD)
    device motion state=NO_MOTION
if (delta position of one axis<INTENTIONAL_MOTION_THRESHOLD && delta position of other two axis<NO_MOVEMENT_THRESHOLD && occurs over a sequence of frames)
    device motion state=INTENTIONAL_MOTION
if (delta position of any axis>UNINTENTIONAL_MOTION_THRESHOLD)
    device motion state=UNINTENTIONAL_MOTION The device-motion state is then stored in association with the image.

Motion estimation finds movement within a frame (intra-frame) as opposed to finding movement between frames (inter-frame). A block-based motion-estimation scheme uses a sum of absolute differences ("SAD") as the primary cost metric. Other embodiments may use object tracking. Generic motion-estimation equations include:

$$SAD(i, j) = \sum_{x=0}^{N-1} \sum_{y=0}^{N-1} |s(x, y, l) - s(x+i, y+j, k-l)|$$

$s(x, y, l)$ where $0 \le x, y \le N-1$ $$[vx, vy] = \underset{i,j}{\operatorname{argmin}}[SAD[i, j]]$$

where:
S(x, y, l) is a function specifying pixel location;
(l)=candidate frame;
(k)=reference frame; and
(vx, vy) is the motion-vector displacement with respect to (i, j).

The motion-estimation procedure compares each N×N candidate block against a reference frame in the past and calculates the pixel displacement of the candidate block. At each displacement position, SAD is calculated. The position that produces the minimum SAD value represents the position with the lowest distortion (based on the SAD cost metric).

Once the raw vectors are calculated for each N×N block, the vectors are filtered to obtain the intra-frame motion. In one exemplary method:
Motion is estimated with predicted motion vectors;
The median filter is applied to the motion vectors;

Motion vectors are additionally filtered for the following reasons:
IIMVII>a static-motion threshold; or
IIMVII>a dynamic-motion threshold; or
Collocated zero SAD>mean zero SAD (of all blocks); or
Block SAD<a large-SAD threshold; or
Luma variance>a low-block-activity threshold;
Create a mask region (e.g., inscribe a maximal regular diamond in the rectangular frame and then inscribe a maximal regular rectangular (the "inner rectangle") in the diamond); and
Calculate:
Diamond_Count=num(MV in the diamond region))/num(MV in the frame); and
Inner_Rectangle_Count=num(MV in the inner rectangle))/num(MV in the diamond region).

Each frame of video is characterized as "interesting" (or not) based on metrics such as internal movement in the frame, luma-exposure values, device motion, Sobel-gradient scores, and face motion. These metrics are weighted to account for the priority of each metric.

Internal Frame Motion: Calculated from Diamond Count and Inner_Rectangle_Count ratios;
Luma Exposure: Calculated from pixel data and weighted less for over or under exposed images;
Sobel-Gradient Scores: Calculated from pixel data and weighted less for Sobel scores that are far from the temporal average of Sobel scores for each frame;
Device Motion: Uses device-motion states and weighted less for UNINTENTIONAL_MOTION
Face Motion: Motion vectors are calculated from detected positions for each face. Weighted less for larger motion vectors for each face.

Putting these together:

$$\text{motion\_frame\_score} = \sum_{i=0}^{N} w(i) * \text{metric}(i)$$

If the motion frame score exceeds a threshold, then the frame is included in a "sequence calculation." This sequence calculation sums up the number of frames that have interesting information and compares that to a sequence-score threshold. If the sequence-score is greater than the threshold, then the scene is marked as an interesting video clip and is permanently stored (step 312 of FIG. 3).

Before a video clip is stored, the start and stop points are calculated. Based on device motion, the first level of delimiters are applied. The procedure finds the segment in the video where the device was marked as NO_MOTION and marks the start and stop points. As a secondary check, the procedure also examines intra-frame motion in each frame and marks those sub-segments within the segment that have no camera motion to indicate when interesting motion occurred in the video. The first frame with interesting intra-frame motion is the new start of the video clip, and the last frame after capture in the video with interesting motion ends the video clip. In some embodiments, the clip is extended to capture a small amount of time before and after the interesting section.

Horizon detection (see FIG. 7 and accompanying text) processes image frames and sensor data to find the frame with the most level horizon. If none of the images contain a 0 degree (within a threshold) horizon line, then the image is rotated and cropped to create an image with a level horizon. Vertical lines can be used in detecting the horizon as well.

In some embodiments, the following procedure is performed continuously, as each frame arrives. For each image:

Associate an angle position from the motion sensors with the image;

Apply a Gaussian blur filter followed by an edge-detection filter on the image (e.g., use a Canny detection filter);

Apply image processing to find lines in the image (e.g., use a Hough Line Transform). For each line found:

Calculate the angle of the line with reference to 0 degrees orientation of the device (i.e., horizontal); and Keep lines that are:

Within some angle threshold; and

Within some length threshold;

Find the longest line (called the "maximal line"), the start and end positions of the maximal line, and the angle of the maximal line. (It is useful to store line information in polar and Cartesian coordinates and in a linear equation.)

At this point in the procedure, each image contains metadata corresponding to the following parameters: the length of the maximal line, the maximal line's angle with respect to the horizon, the linear equation of the maximal line, and the device orientation (i.e., the angle of the device with respect to the image plane derived from the motion sensors).

For each series of images, remove from consideration those images where the absolute difference (device orientation angle minus angle of the maximal line) is greater than a threshold. This allows physical motion-sensor information to be used in conjunction with pixel information to determine the angle.

Find the "region of interest" for each image. To do this, extend the maximal line in the image to two boundaries of the image. The region of interest is the smallest rectangle bounded on the right and left sides of the image that contains the maximal line.

Next find the "reference region" by finding the area of greatest overlap among the regions of interest of the relevant images. This helps verify that each maximal line is actually the same horizon line but captured at different angles in the different images. Remove from consideration any images whose maximal lines fall outside of the reference region.

Finally, for the relevant images, select that image whose maximal line in the reference region has an angle closest to 0 degree orientation (that is, closest to horizontal). Use that as the detected horizon. If necessary, that is, if the angle of the selected image is greater than some threshold, the rotate the image using the calculated angle and crop and upscale the image.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   capturing, simultaneously by an image-capture device, a video segment and a sequence of still images;
   determining, by the image-capture device, that a first score of a quality characteristic for a first still image from the sequence of still images is greater than a second score of the quality characteristic for a second still image from the sequence of still images; and
   adjusting, by the image-capture device, the video segment based on one or more characteristics of the first still image.

2. The method of claim 1, wherein capturing the video segment and the sequence of still images is in temporal proximity to a capture command received by the image-capture device.

3. The method of claim 1, further comprising presenting, by the image-capture device, the adjusted video segment and the first still image, and wherein presenting the adjusted video segment and the first still image includes presenting the first still image using a gallery mode.

4. The method of claim 1, wherein the video segment is a first portion of the video segment and the sequence of still images is a first portion of the sequence of still images, the method further comprising:
   adjusting one or more image-capture settings of the image-capture device to enable a second portion of the video segment and a second portion of the sequence of still images to be captured with the adjusted one or more image-capture settings.

5. The method of claim 4, wherein the adjusted one or more image-capture settings comprises at least one of:
   exposure parameters of the image-capture device; or
   flash lighting of the image-capture device.

6. The method of claim 1, wherein the one or more characteristics of the first still image includes a detected horizon.

7. The method of claim 6, wherein adjusting the video segment comprises:
   determining a maximal line of one or more frames of the video segment;
   determining a difference in angle between the maximal line of the one or more frames of the video segment and the detected horizon; and
   rotating the one or more frames of the video segment based on the difference in angle between the maximal line of the one or more frames of the video segment and the detected horizon.

8. The method of claim 7, wherein adjusting the video segment further comprises determining that the maximal line of the one or more frames is indicative of the detected horizon.

9. The method of claim 7, wherein adjusting the video segment further comprises cropping and upscaling the one or more frames of the video segment.

10. The method of claim 1, wherein the sequence of still images corresponds to frames of the video segment.

11. The method of claim 1, wherein determining that the first score of the quality characteristic for the first still image is greater than the second score of the quality characteristic for the second still image from the sequence of still images is based on a machine-learned model, the machine-learned model configured to utilize one or more user preferences, past behaviors, or privacy settings to determine that the first score of the quality characteristic for the first still image is greater than the second score of the quality characteristic for the second still image from the sequence of still images.

12. The method of claim 1, wherein the first still image from the sequence of still images and the second still image from the sequence of still images are not consecutive still images in the sequence of still images.

13. The method of claim 1, wherein the one or more characteristics of the first still image do not include a quality characteristic.

14. An image-capture device comprising:
a display;
at least one processor; and
one or more non-transitory computer-readable storage media that, when executed by the at least one processor, cause the image-capture device to:
  capture, simultaneously, a video segment and a sequence of still images;
  determine that a first score of a quality characteristic for a first still image from the sequence of still images is greater than a second score of the quality characteristic for a second still image from the sequence of still images; and
  adjust the video segment based on one or more characteristics of the first still image.

15. The image-capture device of claim 14, wherein the image-capture device is a cellphone, a camera, or a tablet.

16. The image-capture device of claim 14, wherein the one or more non-transitory computer-readable storage media, when executed by the at least one processor, further cause the image-capture device to present the adjusted video segment and the first still image.

17. The image-capture device of claim 16, wherein the one or more non-transitory computer-readable storage media, when executed by the at least one processor, further cause the image-capture device to present the adjusted video segment and the first still image using a gallery mode.

18. The image-capture device of claim 14, wherein:
the video segment is a first portion of the video segment and the sequence of still images is a first portion of the sequence of still images; and
the one or more non-transitory computer-readable storage media, when executed by the at least one processor, further cause the image-capture device to adjust one or more image-capture settings of the image-capture device to enable a second portion of the video segment and a second portion of the sequence of still images to be captured with the one or more image-capture settings.

19. The image-capture device of claim 14, wherein the one or more characteristics of the first still image includes a detected horizon.

20. The image-capture device of claim 19, wherein the one or more non-transitory computer-readable storage media, when executed by the at least one processor, further cause the image-capture device to adjust the video segment by:
  determining a maximal line of one or more frames of the video segment;
  determining a difference in angle between the maximal line of the one or more frames of the video segment and the detected horizon; and
  rotating the one or more frames of the video segment based on the difference in angle between the maximal line of the one or more frames of the video segment and the detected horizon.

21. The image-capture device of claim 20, the one or more non-transitory computer-readable storage media, when executed by the at least one processor, further cause the image-capture device to adjust the video segment by determining that the maximal line of the one or more frames are indicative of the detected horizon.

22. The image-capture device of claim 20, wherein the one or more non-transitory computer-readable storage media, when executed by the at least one processor, further cause the image-capture device to adjust the video segment by cropping and upscaling the one or more frames of the video segment.

* * * * *